(12) United States Patent
Mola (10) Patent No.: US 11,030,075 B2
(45) Date of Patent: Jun. 8, 2021

(54) EFFICIENT REGISTER BREAKPOINTS

(71) Applicant: Microsoft Technology Licensing, LLC, Redmond, WA (US)

(72) Inventor: Jordi Mola, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 160 days.

(21) Appl. No.: 16/191,293

(22) Filed: Nov. 14, 2018

(65) Prior Publication Data
US 2020/0151085 A1   May 14, 2020

(51) Int. Cl.
*G06F 11/36* (2006.01)
(52) U.S. Cl.
CPC ...... *G06F 11/3624* (2013.01); *G06F 11/3664* (2013.01)
(58) Field of Classification Search
CPC .................................................. G06F 11/3624
See application file for complete search history.

(56) References Cited

U.S. PATENT DOCUMENTS

| | | | | |
|---|---|---|---|---|
| 5,909,565 A * | 6/1999 | Morikawa | ............ | G06F 9/3885 712/200 |
| 7,043,718 B1 | 5/2006 | Au et al. | | |
| 2001/0027538 A1* | 10/2001 | Wojcieszak | ......... | G06F 11/3648 714/28 |
| 2004/0103129 A1* | 5/2004 | Flores | ................ | G06F 11/3656 708/200 |
| 2014/0033309 A1 | 1/2014 | Leake et al. | | |
| 2015/0055778 A1* | 2/2015 | Cox | ...................... | H04L 9/0869 380/46 |
| 2018/0181480 A1* | 6/2018 | Dracea | ................ | G06F 11/3612 |

OTHER PUBLICATIONS

Watchpoint. Wikitionary. Apr. 14, 2020 [retrieved on Jun. 9, 2020], Retrieved from the Internet: <URL: https://en.wiktionary.org/w/index.php?title=watchpoint&oldid=59146162>.*
"International Search Report and Written Opinion Issued in PCT Application No. PCT/US19/059580", dated Feb. 3, 2020, 14 Pages. (MS# 405283-WO-PCT).
Salwan, Jonathan, "Taint Analysis and Pattern Matching with Pin", Retrieved From: http://shell-storm.org/blog/Taint-analysis-and-pattern-matching-with-Pin/, Aug. 8, 2013, 30 Pages.

* cited by examiner

*Primary Examiner* — Kamini B Patel
(74) *Attorney, Agent, or Firm* — Workman Nydegger (57) ABSTRACT

Efficient register breakpoint checks rely on initiating an event based on an access to a register. Initiating the event can include, based on decoding a machine code instruction, identifying one or more registers that a machine code instruction could touch, and inserting an identification of the touched registers into a stream of executable operations for the machine code instruction. Then, while executing the executable operations, these registers can be compared with a register breakpoint collection. An event can be generated when one of these registers is in the register breakpoint collection. The event might trigger a conditional analysis, an execution break, and/or logging. In some implementations, the event might enable lifetime and/or taint analysis by removing a register from a monitoring collection if the executable operations write to the register, or by adding a destination of a read to the monitoring collection if the executable operations read from the register.

19 Claims, 6 Drawing Sheets

EFFICIENT REGISTER BREAKPOINTS

BACKGROUND

When developing software applications, developers commonly spend a significant amount of time "debugging" application code to find runtime errors in the code. In doing so, developers may take several approaches to reproduce and locate a source code bug, such as observing behavior of a program based on different inputs, inserting debugging code (e.g., to print variable values, to track branches of execution, etc.), temporarily removing code portions, etc. Tracking down runtime errors to pinpoint code bugs can occupy a significant portion of application development time.

Many types of debugging software applications ("debuggers") have been developed in order to assist developers with the code debugging process. These tools offer developers the ability to trace, visualize, and alter the execution of computer code. For example, debuggers may visualize the execution of code instructions, may present variable values at various times during code execution, may enable developers to alter code execution paths, and/or may enable developers to set breakpoints that pause application execution and present program state at the time the breakpoint triggered.

Breakpoints are commonly used to interrupt a running program immediately before the execution of a specified machine code instruction (e.g., as identified by an instruction memory address; these breakpoints are often referred to as instruction breakpoints. Many debuggers also support breakpoints that have conditions, such as the reading, writing, or modification of a specific location in an area of memory; these breakpoints are often referred to as conditional breakpoints, data breakpoints, or watchpoints. Unless otherwise specified herein, any use of the term "breakpoint" herein should be interpretable to cover any breakpoint variant, whether they include conditions or not (e.g., instruction breakpoints, conditional breakpoints, data breakpoints, watchpoints, etc.).

Some processors include limited hardware support for breakpoints on memory addresses. For example, the x86 debug registers allow developers to selectively enable various debug conditions associated with a set of four debug memory addresses. When debug condition(s) for one of these four debug memory addresses is detected, an x86 processor generates a breakpoint trap that can be handled by debugger's handler routine.

Due to the limited number of breakpoints available in hardware, debuggers often implement breakpoint functionality in software. These software breakpoints are generally implemented by the debugger instrumenting the machine code instructions that are the subject of debugging by the debugger with debugging code. This debugging code is then executed during execution of these subject machine code instructions in order to detect and trigger the occurrence of a breakpoint. In general, this debugging code makes extensive use of processor opcodes that interrupt the normal flow of program execution, save program state, and jump to a debugger's handler routine (e.g., to detect whether a breakpoint occurred, to trigger the breakpoint, etc.). When implementing conditional breakpoints (e.g., on memory locations, processor registers, etc.), software breakpoints may interrupt each of the subject machine code instructions, effectively "single-stepping" the processor so that the debugger can perform breakpoint checks on each instruction. As such, software breakpoints bring severe performance penalties, particularly when implementing conditional breakpoints.

BRIEF SUMMARY

At least some embodiments described herein are directed to implementing breakpoint checks on registers in a manner that avoids undesired interruption of normal machine code execution, either by a processor or by an emulator. Thus, embodiments herein can be implemented in a manner that enables breakpoints to be detected without putting a processor into single-stepping modes and/or interrupting processor emulation. When one or more criteria for a breakpoint are met, embodiments could trigger a breakpoint event (e.g., in the form of an interrupt), or log the breakpoint without interruption normal machine code execution. Embodiments herein can also be combined with memory breakpoint functionality to enable lifetime and taint analysis of one or more entities.

In some embodiments, a method for performing a register breakpoint check comprises decoding a machine code instruction that is a subject of a debugging session and, based on the decoding, (i) identifying one or more registers that the machine code instruction could touch, and (ii) inserting an identification of the touched registers into a stream of executable operations for the machine code instruction. Then, based at least on executing the executable operations for the machine code instruction, the method compares at least one of the identified one or more registers with a register breakpoint collection, and generates an event when the register is in the register breakpoint collection.

In other embodiments, a method for performing a register breakpoint check and enabling lifetime analysis comprises decoding a machine code instruction that is a subject of a debugging session, and based on the decoding, identifying (i) one or more registers that the machine code instruction could touch, and (ii) inserting an identification of the touched registers into a stream of executable operations for the machine code instruction. Then, based at least on executing the executable operations for the machine code instruction, the method compares at least one of the identified one or more registers with a register breakpoint collection and generates an event when the register is in the register breakpoint collection. The event can remove the register from a monitoring collection and note a lifetime termination in a lifetime structure when the executable operations write to the register, or the event can add a destination of a read to the monitoring collection and extend the lifetime in the lifetime structure to the destination when the executable operations read from the register.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

At least some embodiments described herein are directed to implementing breakpoint checks on registers in a manner that avoids undesired interruption of normal machine code execution, either by a processor or by an emulator. Thus, embodiments herein can be implemented in a manner that enables breakpoints to be detected without putting a processor into single-stepping modes and/or interrupting processor emulation. When one or more criteria for a breakpoint are met, embodiments could trigger a breakpoint event (e.g., in the form of an interrupt), or log the breakpoint without interruption normal machine code execution. Embodiments herein can also be combined with memory breakpoint functionality to enable lifetime and taint analysis of one or more entities.

For example, a register breakpoint check can comprise inserting an identification of one or more registers that a machine code instruction touches into a stream of executable operations for the machine code instruction. These executable operations can be executed/evaluated by execution units of a processor, or by an emulator, to carry out execution of the machine code instruction. Based at least on executing/evaluating these executable operations, one or more of the identified registers can be compared with a register breakpoint collection, and an event can be generated when the register is in the register breakpoint collection. The event could trigger and/or log a breakpoint (e.g., for unconditional breakpoints), or could trigger a conditional analysis to determine if one or more criteria for the breakpoint were met (e.g., whether a register access was a read or write, what value was read/written, etc.).

When efficient register breakpoints are combined with efficient memory breakpoints, embodiments can automatically add/remove storage locations to collections that are associated with various entities, enabling fast lifetime and taint analysis. For example, when a breakpoint on a memory location or register in one of these collection is triggered, embodiments can remove a touched register from a monitoring collection and note a lifetime termination in a lifetime structure when the executable operations write to the touched register, or embodiments can add a destination of a read to the monitoring collection and extend the lifetime in the lifetime structure to the destination when the executable operations read from the touched register.

Figure 1:
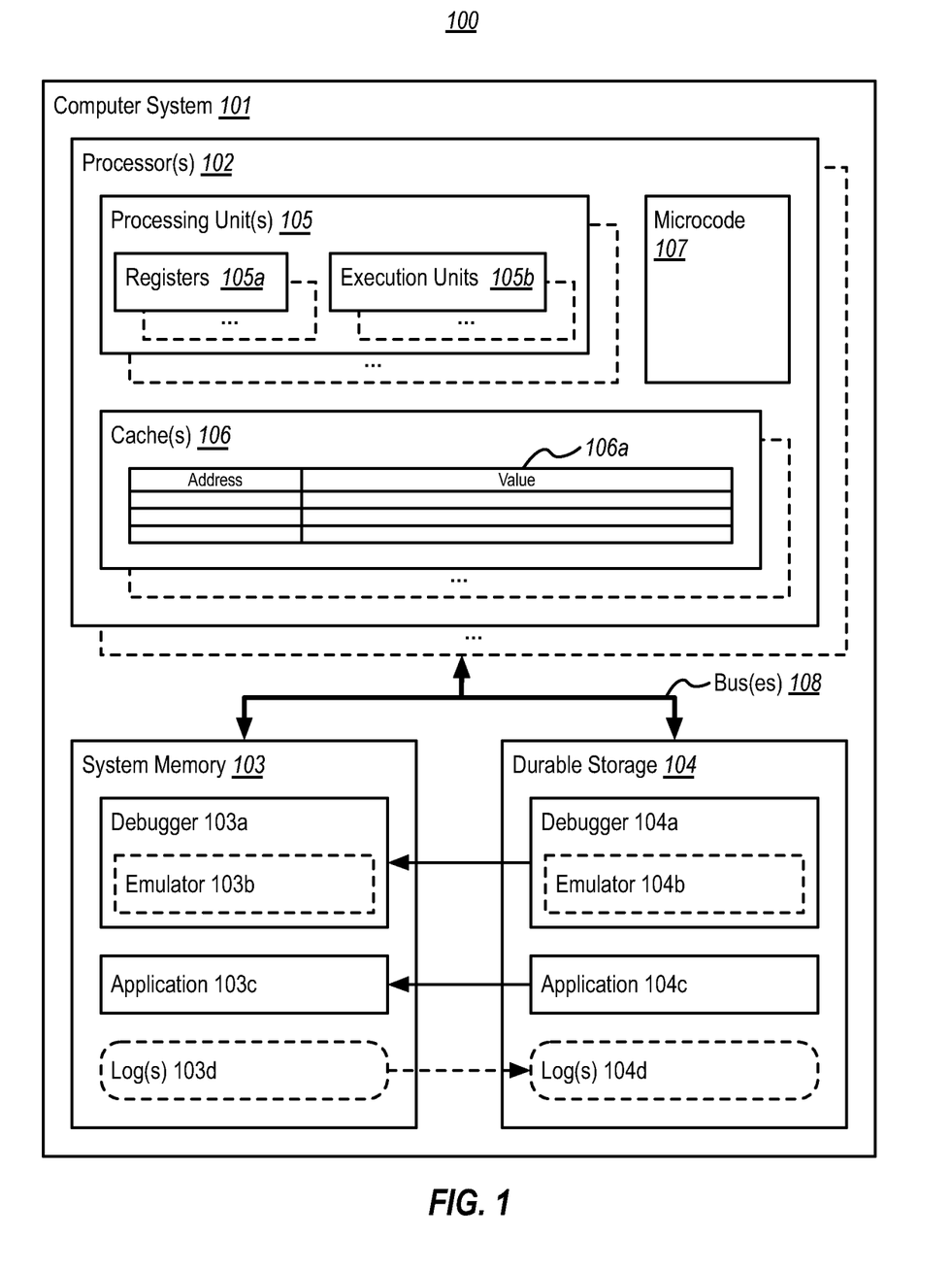
FIG. 1 illustrates an example computing environment that facilitates efficient register breakpoints.

To the accomplishment of the foregoing, FIG. 1 illustrates an example computing environment 100 that facilitates efficient register breakpoints. As depicted, embodiments may comprise or utilize a special-purpose or general-purpose computer system 101 that includes computer hardware, such as, for example, one or more processor(s) 102, system memory 103, and durable storage 104, which are communicatively coupled using one or more communications bus(es) 108.

Embodiments within the scope of the present invention include physical and other computer-readable media for carrying or storing computer-executable instructions and/or data structures. Such computer-readable media can be any available media that can be accessed by the computer system. Computer-readable media that store computer-executable instructions and/or data structures are computer storage devices. Computer-readable media that carry computer-executable instructions and/or data structures are transmission media. Thus, by way of example, and not limitation, embodiments of the invention can comprise at least two distinctly different kinds of computer-readable media: computer storage devices and transmission media.

Computer storage devices are physical hardware devices that store computer-executable instructions and/or data structures. Computer storage devices include various computer hardware, such as RAM, ROM, EEPROM, solid state drives ("SSDs"), flash memory, phase-change memory ("PCM"), optical disk storage, magnetic disk storage or other magnetic storage devices, or any other hardware device(s) which can be used to store program code in the form of computer-executable instructions or data structures, and which can be accessed and executed by the processors 102 to implement the disclosed functionality of the invention. Thus, for example, computer storage devices may include the depicted system memory 103, the depicted durable storage 104, and/or the depicted microcode 105c, which can each store computer-executable instructions and/or data structures.

Transmission media can include a network and/or data links which can be used to carry program code in the form of computer-executable instructions or data structures, and which can be accessed by the computer system 101. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage devices (or vice versa). For example, computer-executable instructions or data structures received over a network or data link can be buffered in RAM within a network interface module (e.g., a "NIC"), and then eventually transferred to the system memory 103 and/or to less volatile computer storage devices (e.g., durable storage 104) at the computer system 101. Thus, it should be understood that computer storage devices can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

As illustrated, the durable storage 104 can store computer-executable instructions and/or data structures representing application programs such as, for example, a debugger 104a (potentially including an emulator 104b) and an application 104c (e.g., which could be a user-mode code and/or kernel-mode code). In general, the debugger 104a is usable to control and observe execution of applications, such as application 104c. If present, the emulator 104b comprises software that emulates computer hardware, such as the processor(s) 102, when executed. While the emulator 104b is depicted as being part of debugger 104a, it could potentially be a separate application or component. In some embodiments, the debugger 104a and/or the emulator 104b could be standalone application(s), while in other embodiments the debugger 104a and/or the emulator 104b could be integrated into another software component, such as an operating system kernel, a hypervisor, a cloud fabric, etc.

In embodiments, during operation of computer system 101, the processors 102 cause the debugger 104a (including the emulator 104b, if it is present) and the application 104c to be loaded into system memory 103 (i.e., as indicated by the solid arrow between debugger 104a and debugger 103a, and the solid arrow between application 104c and application 103c). The debugger 103a can cause machine code instructions of the application 103b to be executed under its control and observation. The debugger 103a might cause these instructions to be executed directly at the processors 102, or indirectly at the emulator 103b (which, in turn, executes at the processors 102). In embodiments, the debugger 103a might store log(s) 103d in system memory 103 which, if desired, can also be persisted to the durable storage 104 (i.e., as indicated by the broken arrow between logs 103d and log(s) 104d). As will be discussed later, these logs 103d might store (among other things) data relating to breakpoints that have been triggered.

FIG. 1 details some of the components of each processor 102 that can be used to implement various embodiments described herein. As shown, each processor 102 can include (among other things) one or more processing unit(s) 105 (e.g., processor cores) and one or more cache(s) 106. As shown, each processing unit 105 can include (or be associated with) a plurality of registers 105a and a plurality of execution units 105b. In general, each processing unit 105 loads and executes machine code instructions (e.g., of debugger 103a, emulator 103b, application 103c, etc.) from the caches 106 (e.g., a "code" portion of the caches 106) and executes those instructions at the execution units 105b. During execution of these instructions, the instructions can use the registers 105a as temporary storage locations and can read and write to various locations in system memory 103 via the caches 106 (e.g., using a "data" portion of the caches 106). If a processing unit 105 requires data (e.g., code or application runtime data) not already stored in the caches 106, then the processing unit 105 can initiate a "cache miss," causing data to be fetched from the system memory 103 and stored in the caches 106—while potentially "evicting" some other data from the caches 106 back to system memory 103. While operation of the various components of each processor 102 is controlled in large part by hardware digital logic (e.g., implemented using transistors), operation of the various components of each processor 102 can also be controlled, at least in part, using software instructions contained in microcode 107.

The registers 105a are hardware-based storage locations that are read from and/or written to by executing machine code instructions. For example, registers 105a are commonly used to store values fetched from the caches 106 for use by machine code instructions, to store the results of executing machine code instructions, and/or to store status or state—such as some of the side-effects of executing machine code instructions (e.g., the sign of a value changing, a value reaching zero, the occurrence of a carry, etc.), a processor cycle count, etc. Thus, some registers 105a may comprise "flags" that are used to signal some state change caused by executing processor instructions. In some embodiments, registers 105a may also include control registers, which are used to control different aspects of processor operation. In most processor implementations, there is a different set of registers devoted to each processing unit 105, though there could be registers (not shown) that apply to the processor 102 generally.

Generally, the caches 106 comprises a plurality of "cache lines," each of which stores a chunk of memory from a backing store. For example, FIG. 1 symbolically illustrates the caches 106 using a table 106a, in which each row (i.e., cache line) in the table stores at least an address and a value. The address might refer to a location (e.g., a memory cell) in system memory 103. The address might be a physical address (e.g., the actual physical location in the system memory 103), or address might be a virtual address (e.g., an address that is mapped to the physical address to provide an abstraction). Virtual addresses could be used, for example, to facilitate memory isolation between different processes executing at the processors 102.

When virtual addresses are used, a processor 102 may include one or more translation lookaside buffers ("TLBs") (not shown) that maintain mappings between physical and virtual memory addresses. The value of each cache line might initially (i.e., after a cache miss) correspond a value received from that address in system memory 103. The value might then be modified by one or more of the processing units 105, and eventually be evicted back to system memory 103. While table 106a shows only three rows, a cache can include a large number of cache lines. For example, a contemporary INTEL processor may contain one or more L1 caches comprising 512 or more cache lines, with each cache line typically being usable to store a 64-byte (512-bit) value in reference to an 8-byte (64-bit) memory address.

Often times, a processor cache is divided into separate levels (also referred to as tiers or layers). For example, the caches 106 could comprise a different L1 cache for each processing unit 105, one or more L2 caches that are each shared by two or more of the processing units 105 and backing their L1 caches, an L3 cache backing multiple L2 caches, etc. When multiple cache levels are used, the processing units 105 generally interact directly with (and often include) the lowest level (i.e., L1). In most cases, data flows between the levels (e.g., on a read an L3 cache interacts with the system memory 103 and serves data to an L2 cache, and the L2 cache in turn serves data to the L1 cache). When a processing unit 105 needs to perform a write, the caches 106 coordinate to ensure that those caches that had affected data that was shared among the processing units 105 don't have it anymore. This coordination is performed using a cache coherence protocol ("CCP").

The microcode 107 comprises software logic (i.e., executable instructions) that control operation of the various components of the processors 102, and which generally functions as an interpreter between the internal hardware of the processor and the processor instruction set architecture ("ISA") that is exposed by the processors 102 to executing applications. The microcode 107 may be embodied on read-only and/or read-write on-processor storage, such as ROM, EEPROM, etc.

Figure 2:
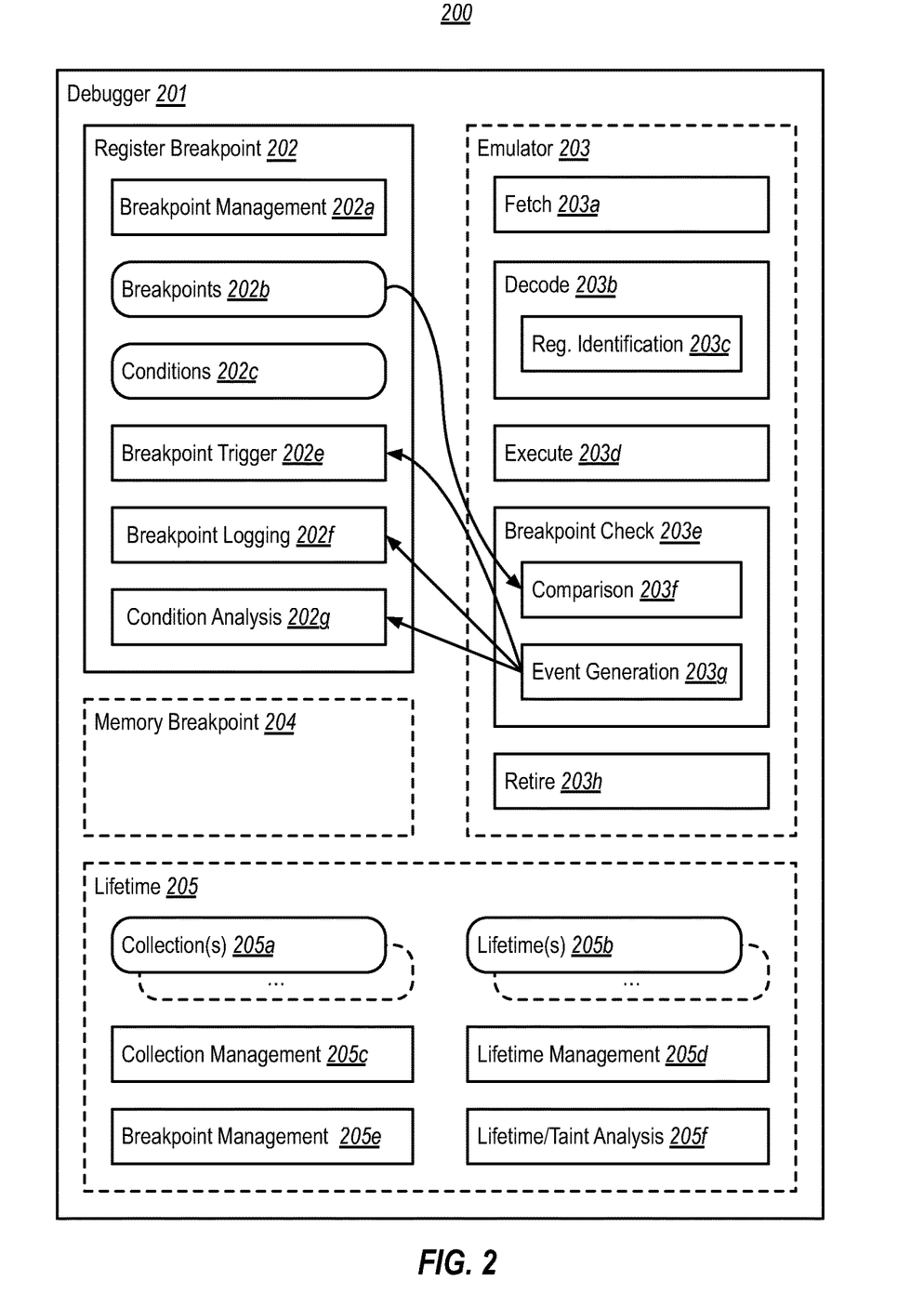
FIG. 2 illustrates an example of a debugger that implements efficient register breakpoint functionality.

Given the context of computer system 100 of FIG. 1, FIG. 2 illustrates an example 200 of a debugger 201 (e.g., corresponding to debugger 104a of FIG. 1). As depicted, debugger 201 includes a variety of components (e.g., register breakpoint 202, emulator 203, memory breakpoint 204, lifetime 205, etc.), including sub-components, that represent various functionality the debugger 201 might implement in accordance with various embodiments described herein. It will be appreciated that these components and sub-components—including their identity and arrangement—are depicted merely as an aid in describing various embodiments described herein, and that these components/sub-components are non-limiting to how software and/or hardware might implement various embodiments described herein.

The register breakpoint component 202 represents functionality of the debugger 201 that can be used to set, check, trigger, and/or present breakpoints during execution of machine code instructions of a subject application (e.g., application 104c). These could include register breakpoints (e.g., on registers 105a or emulated representations thereof). For example, FIG. 2 illustrates register breakpoint component 202 as including functionality for managing breakpoints (e.g., breakpoint management component 202a), for triggering breakpoints (e.g., breakpoint trigger component 202e), for logging breakpoints (e.g., breakpoint logging component 202f), for checking breakpoint conditions (e.g., condition analysis component 202g), etc. In addition, FIG. 2 illustrates register breakpoint component 202 as including and/or managing various breakpoint-related data, such breakpoint collection(s) (e.g., breakpoints 202b), breakpoint conditions (e.g., conditions 202c), etc. which can be managed, for example, by the breakpoint management component 202a.

With respect to register breakpoints, the register breakpoint component 202 can interoperate with a processor 102 implemented in accordance with embodiments described herein, and/or with an emulator implemented in accordance with embodiments described herein (e.g., emulator component 203), in order to implement register breakpoint functionality that can perform register breakpoint checks in a manner that avoids breaking out of a machine code instruction's execution context. Thus, the register breakpoint component 202 can facilitate register breakpoint check functionality that avoids single-stepping the processor 102 and/or that avoids stopping emulation, thereby greatly enhancing the performance of register breakpoint functionality as compared to prior implementations that rely on code instrumentation (typically by several orders of magnitude).

For efficiency, these embodiments are described primarily in the context of emulator component 203 (e.g., corresponding to emulator 104b); however, it will be appreciated by one of ordinary skill in the art that these embodiments could be implemented in processors 102 themselves (as will be discussed in further detail below). As shown, similar to most physical processors, emulator component 203 includes functionality for fetching (e.g., fetch component 203a), decoding (e.g., decode component 203b), executing (e.g., execute component 203d), and retiring/committing (e.g., retire component 203h) machine code instructions. As shown, emulator component 203 includes additional functionality that can be used to check for breakpoints during a machine code instruction's fetch/decode/execute/retire cycle, and that interoperates with the register breakpoint component 202. This functionality is represented as a register identification component 203c within the decode component 203c, and breakpoint check component 203e containing a comparison component 203f and an event generation component 203g.

Figure 3:
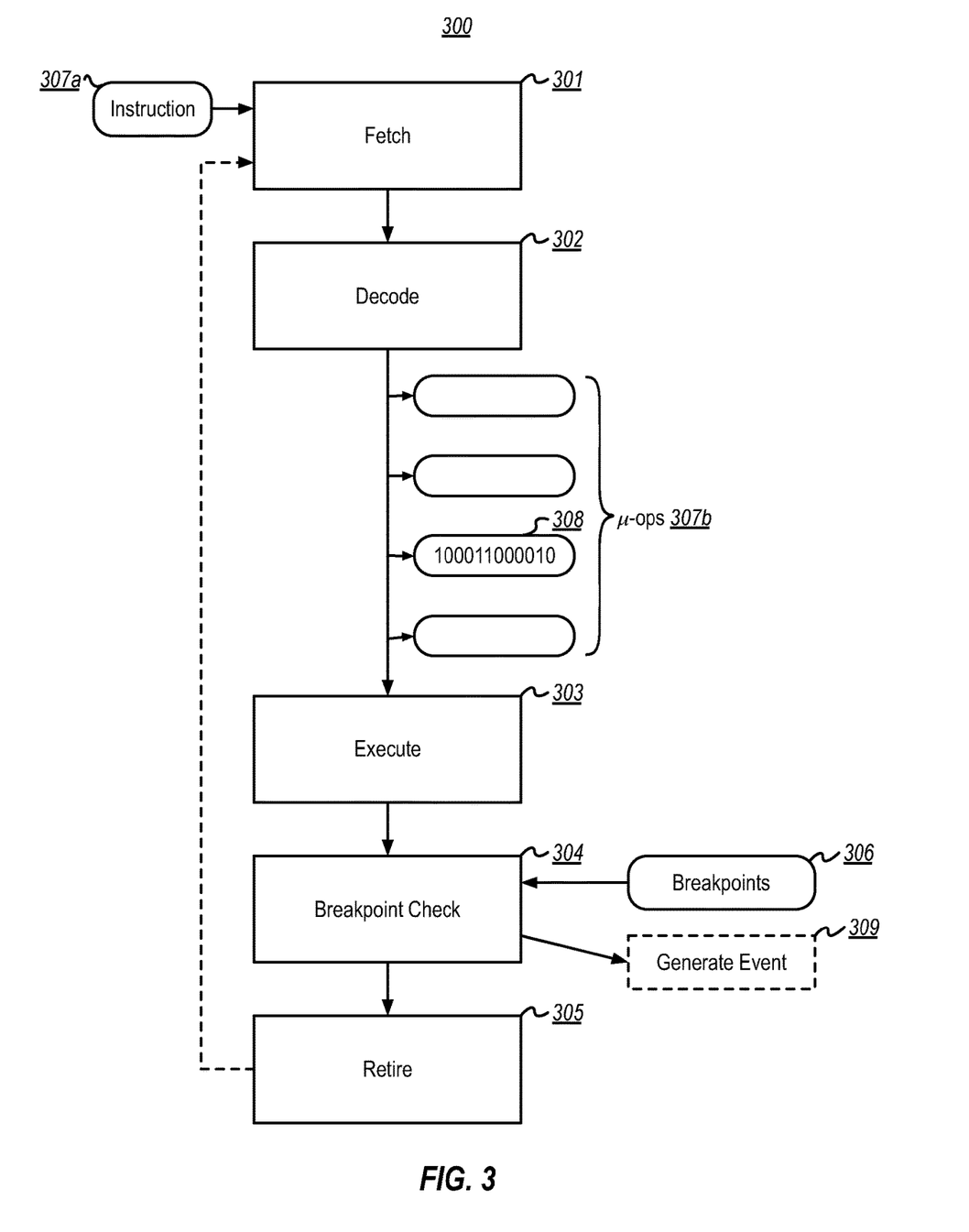
FIG. 3 illustrates an example flowchart of a fetch, decode, execute, and retire cycle that incorporates efficient register breakpoint detection.

This functionality is now described in connection with FIG. 3, which illustrates an example flowchart 300 of a fetch, decode, execute, and retire cycle that incorporates efficient register breakpoint detection. As shown, flowchart 300 begins with a fetch step 301 (e.g., performed by fetch component 203a) that fetches at least one machine code instruction 307a. The flowchart 300 then proceeds to a decode step 302 (e.g., performed by decode component 203b), which decodes the machine code instruction 307a. As is known to one of ordinary skill in that art, during a decode cycle many physical processors 102 decode each machine code instruction into one or more micro-operations ("μ-ops") that can be executed at execution units 105b. Decode component 203b might similarly decode machine code instruction 307a into μ-ops (e.g., software μ-ops). Depending on implementation of the emulator 203, these software μ-ops might be similar to the μ-ops a physical processor might generate, or they could be entirely different. Regardless of their format, these software μ-ops are represented in FIG. 3 as μ-ops 307b.

As shown, the decode component 203b can include a register identification component 203c. In accordance with embodiments herein, the register identification component 203c can identify any register(s), or portions thereof, that could be "touched" by machine code instruction 307a during its execution. These could include, for example, register(s) that are read by machine code instruction 307a, register(s) that are written to by machine code instruction 307a, and/or any flag(s) that could be affected by execution of the machine code instruction. As will be appreciated by one of ordinary skill in the art, processors often implement flags using one or more "flag" registers that comprise a plurality of bits, and that use each bit to represent a different flag. In embodiments, the identification component 203c could identify flags individually (and thus support breakpoints on individual bits within a flag register), or could identify a flag register generally (and thus support breakpoints on the flag register generally, but perhaps not on individual bits within that register). The decode component 203b then inserts an identification of the touched registers and/or flags into the μ-ops 307b, as represented in FIG. 3 by a series of bits 308.

This identification could take many forms, depending on implementation, but as shown by bits 308 an example could be a series of bits that each corresponds to a different processor flag that could be touched by machine code instructions, and in which this series of bits 308 indicates which register(s) were identified by the identification component 203c (e.g., by using set bits for the identified register(s), and cleared bits for the other registers). In embodiments, this series of bits could include a different bit for each flag (thus supporting breakpoints on individual flags) or could include a single bit for a flag register generally (thus supporting breakpoints on the flag register generally, but not on individual flags).

Flowchart 300 continues with an execute step 303 (e.g., performed by execute component 203d) that executes/evaluates the μ-ops, and to a breakpoint check step 304 (e.g., performed by breakpoint check component 203e). In the breakpoint check step 304, the comparison component 203f can compare the identification of the touched registers (e.g., bits 308) with a collection of active register breakpoints 306 (e.g., originating from breakpoints collection 202b, as indicated by the arrow between breakpoints collection 202b and comparison component 203f). If one or more of the touched registers matches with one or more registers from the collection of active register breakpoints 306, then the event generation component 203g might generate one or more events at step 309. Notably, when a plurality of registers match, the event generation component 203g might generate a different event for each matched register (e.g., to break/log for each matched register), or might generate a single event (e.g., to break/log for the machine code instruction 307a generally). Otherwise, the breakpoint check component 203e can permit execution of the machine code instruction 307a to proceed normally. For example, flowchart 300 can conclude with a retire step 305 (e.g., performed by retire component 203h) which retires the machine code instruction 307a. As shown, retirement of a machine code instruction 307a might result in another fetch/decode/execute/retire cycle.

Note that while the breakpoint check step 304 is shown as being a discrete step, this step could be performed as part of one or more of the other steps, such as the execute step 303 and/or the retire step 305. Correspondingly, the comparison component 203f and/or the event generation component 203g could be part of the execute component 203d and/or the retire component 203h, rather than being part of a separate breakpoint check component 203e. Additionally, while the breakpoint check step 304 is shown in flowchart 300 as being after of the execute step 303, some embodiments might perform the breakpoint check step 304 prior to the execute step 303.

If one or more events are generated at step 309 due to the touched registers matching with register(s) from the collection of active register breakpoints 306, these event(s) might trigger one or more of a variety of behaviors. For example, if the breakpoint has no condition, an event might actually trigger a breakpoint (e.g., by calling the breakpoint trigger component 202e, as shown in FIG. 2 by the arrow between event generation component 203g and breakpoint trigger component 202e), which may include exiting/pausing the emulator 203. Additionally, or alternatively, if the breakpoint has no condition, an event might log the breakpoint to the logs 103d (e.g., by calling the breakpoint logging component 202f, as shown in FIG. 2 by the arrow between event generation component 203g and breakpoint logging component 202f).

Notably, logging might potentially be performed without actually exiting/pausing the emulator component 203. As such, embodiments might detect the occurrence of a breakpoint, but chose to log it rather than actually interrupting execution. The data logged for a breakpoint can comprise any appropriate information, such as an identification of the breakpoint (e.g., in breakpoints collection 202b) that was triggered, an identification of the instruction that triggered the breakpoint (e.g., by instruction address, by instruction count, etc.), the identity of the register(s) that were touched to trigger the breakpoint, one or more value(s) of the touched register(s) (e.g., a value before a register was touched and/or a value after the register was touched), a type of operation performed on the register(s) (e.g., read, write, etc.), and the like.

Alternatively, if the breakpoint does have a condition (e.g., which could be indicated in the breakpoints collection 202b), an event might trigger an analysis of how the machine code instruction 307a actually affected the matching register(s) to determine if breakpoint(s) should be triggered or logged (e.g., by calling the condition analysis component 202g, as shown in FIG. 2 by the arrow between event generation component 203g and condition analysis component 202g), which may include exiting/pausing the emulator component 203. The condition analysis component 202g can then refer to conditions 202c to determine if the machine code instruction 307a affected the matching register(s) in a way that meets the conditions. For example, the condition analyzer 202g might determine what type of operation was performed on the matching register(s) (e.g., a read or write), value(s) that were read from the matching register(s), value(s) that were written to the register(s), a type of flag change that occurred, etc. If the condition analysis component 202g determines that breakpoint conditions were met, the condition analysis component 202g might trigger a breakpoint (e.g., using breakpoint trigger component 202e) and/or log the breakpoint (e.g., using breakpoint logging component 202f).

As such, the emulator component 203 can identify, during a normal fetch/decode/execute/retire cycle, whether the registers touched by a given machine code instruction should trigger a breakpoint or logging (i.e., if the breakpoint is unconditional), or whether an additional condition analysis needs to be performed. This means that machine code instructions need not be executed in a single-stepping manner using code instrumentation, as in prior register breakpoint solutions, greatly enhancing the performance of execution of code that is the subject of a debugging session. This, in turn, greatly enhances the availability and utility of register breakpoints.

While flowchart 300 was described in connection with emulator component 203, it will be appreciated that embodiments could implement flowchart 300 on processor hardware directly. For example, in embodiments, a processor's decode cycle could produce a list of touched registers, and the processor's execute and/or retire cycles could compare that list to a breakpoint collection 202b. Notably, some processors may already produce internal register list(s) that are used, for example, as part of register renaming features. In embodiments, such list(s) could be used to implement the breakpoint detection functionality herein. In embodiments, this might mean extending such list(s), such as with metadata indicating which register(s) are touched by which instruction(s), metadata indicating how these register(s) are touched (e.g., read, write, etc.), and the like. If a processor does implement register renaming, then the component(s) that compare the register list(s) to breakpoint collection 202b might need to be aware of such register renaming (e.g., depending on when the comparison is performed in the fetch/decode/execute/retire cycle and/or depending on whether the processor performed in-order or out-of-order instruction execution). Also, in order to avoid interrupting instruction execution to perform the comparison during an execute/retire cycle, the breakpoint collection 202b might need to be stored on the processor itself. This means that the breakpoint collection 202b may need to have a bounded size, in order to ensure that it can fit within available on-processor storage. In embodiments, a processor could also implement logging functionality, such that it could initiate logging of breakpoints to logs 103d, without needing to break from a fetch/decode/execute/retire cycle.

It is noted that embodiments might enable the efficient register breakpoint features to be enabled and disabled. If this is the case, then when the features are enabled, embodiments might flush one or more code caches so that the register identification component 203c can be activated the next time any machine code instructions are decoded.

In addition, embodiments might apply one or more optimizations to the register breakpoint embodiments described thus far. For example, some embodiments might use the register identification component 203c to insert an identification of touched registers into the μ-ops only when one (or more) of the identified registers are in the collection of breakpoints 202b. Other embodiments might compare an identified register or the collection of breakpoints 202b only if that register was actually by the μ-ops. This might be useful, for example, in the case of flags which may not actually be affected by the μ-ops, depending on the circumstances.

Figure 4:
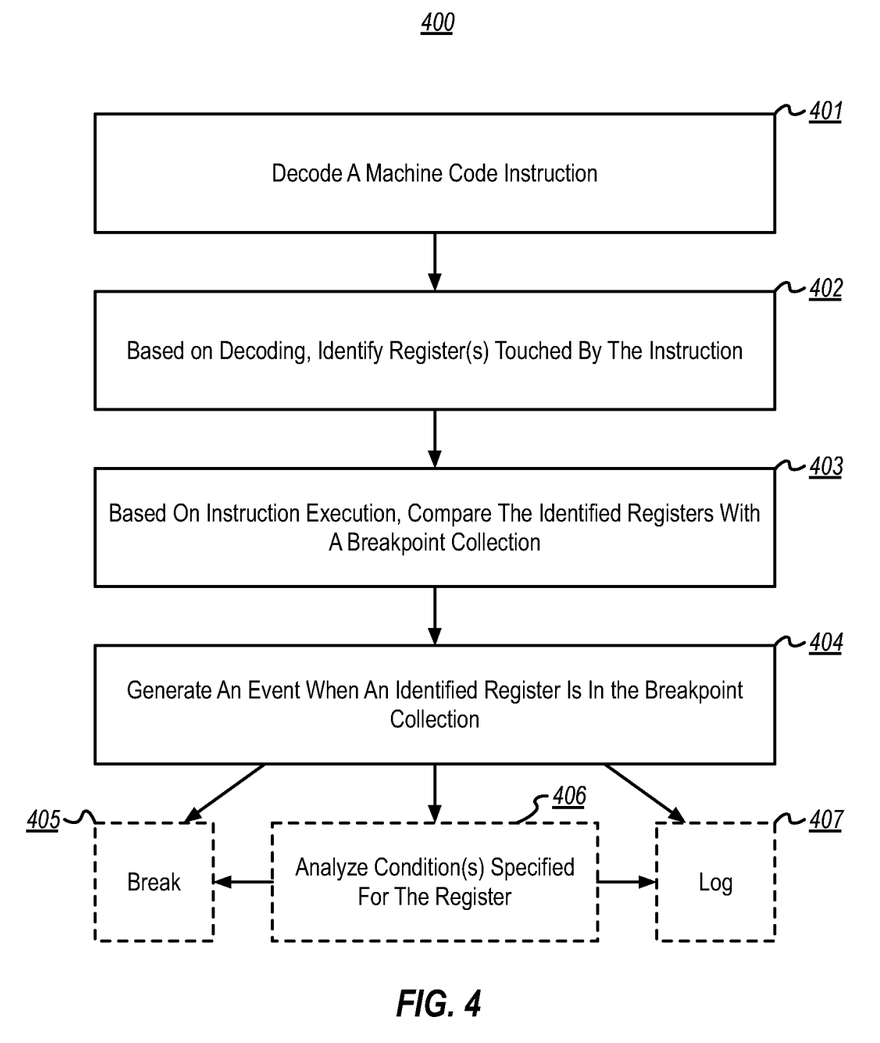
FIG. 4 illustrates a flow chart of an example method for performing a register breakpoint check.

In view of the foregoing, FIG. 4 illustrates a flow chart of an example method 400 for performing a register breakpoint check. In general, method 400 is implemented at computing system (e.g., computer system 100) that includes one or more processors (e.g., processors 102). Method 400 might be implemented in software (e.g., utilizing emulator 103b), or in hardware (e.g., by extensions to processing units 105 and/or microcode 107).

As shown, method 400 includes an act 401 of decoding a machine code instruction. In some embodiments, act 401 comprises decoding a machine code instruction that is a subject of a debugging session. For example, the decode component can decode a machine code instruction of an application (e.g., application 104c) that is the subject of debugging by debugger 103a into μ-ops (or equivalent) that can be executed and/or evaluated in order to carry out execution of the machine code instruction.

Method 400 also includes an act 402 of, based on decoding, identifying register(s) touched by the instruction. In some embodiments, act 402 comprises, based on the decoding, identifying one or more registers that the machine code instruction could touch. For example, the register identification component 103c can identify any registers (e.g., processor registers emulated by emulator 203) that are touched, and/or could be touched, by the machine code instruction. A register might be touched because it is an input and/or an output for the machine code instruction (and thus it will be read from and/or written to by the instruction's μ-ops), or because it could potentially be affected as a side-effect of execution of the instruction's μ-ops (e.g., in the case of a flag). In embodiments, the register identification component 103c inserts an identification of the touched registers into the stream of μ-ops (or equivalent). Thus, act 402 can also comprise inserting an identification of the touched registers into a stream of executable operations for the machine code instruction.

Method 400 also includes an act 403 of, based on instruction execution, comparing the identified registers with a breakpoint collection. In some embodiments, act 403 comprises, based at least on executing the executable operations for the machine code instruction, comparing at least one of the identified one or more registers with a register breakpoint collection. For example, the comparison component 203f can compare one or more of the registers in the list of registers that were identified by the identification component 103c with a breakpoint collection (e.g. breakpoints collection 202b).

In some embodiments, comparison component 203f might compare registers to the breakpoint collection only if the μ-ops actually touched those registers. For example, an identified register may correspond to a flag that may not actually be touched by the μ-ops, depending on the conditions in which they execute. In the event that a flag is not actually touched, the comparison component 203f might omit comparing it to the breakpoint collection. Thus, act 403 might compare a register with the register breakpoint collection only when the executable operations touch the register.

Method 400 also includes an act 404 of generating an event when an identified register is in the breakpoint collection. In some embodiments, act 404 comprises generating an event when the register identified in act 403 is in the register breakpoint collection. For example, the comparison component 203f might determine that a register in list of registers that were identified by the identification component 103c is in the register breakpoint collection, and as a result, the event generation component 203g can generate an event.

As was discussed, this event could directly trigger a breakpoint (e.g., using breakpoint trigger component 202e) and/or could initiate logging of a breakpoint (e.g., using breakpoint logging component 202f). Alternatively, this event could trigger an analysis of one or more breakpoint conditions (e.g., using condition analysis component 202g), which might then trigger a breakpoint and/or trigger logging. As such, as shown, method 400 might also include one or more of: include an act 406 of breaking, an act 406 of analyzing condition(s) specified for the register, and/or act 407 of triggering logging. If method 400 includes act 406, the one or more conditions include at least one of a read condition, a write condition, or a register value condition.

In embodiments, the efficient register breakpoint detection described thus far could be extended with an ability to automatically add new breakpoints and/or remove existing breakpoints when breakpoint event is generated. For example, a register breakpoint event for a given register might remove the register from the breakpoints collection 202b, or might add another register to or remove another register from the breakpoints collection 202b (e.g., one that was also operated on by the machine code instruction that triggered the breakpoint event). It is noted that the ability to automatically add new breakpoints and/or remove existing breakpoints when a breakpoint event is generated can enable types of analysis that have not been practical or even possible before. For example, embodiments could enable an analysis that could detect such things as when subject code (e.g., such as malware) tries to obfuscate movement of data through use of flags (e.g., by copying a first register into a second register one bit at a time via a carry flag or an overflow flag).

Such automated breakpoint addition/removal capabilities could even be extended to also operate with memory breakpoints (e.g., using memory breakpoint component 204). Thus, for example, triggering of a register breakpoint could result in the addition or removal of a memory breakpoint(s), or triggering of a memory breakpoint could result in the addition or removal of a register breakpoint(s). These embodiments could be used to track the entire lifetime of data associated code entities (e.g., primitives, data structures, etc.)—even as this data passes between memory and registers, and even across transformation of this data. As such, embodiments can leverage the efficient register breakpoint detection described above as part of code entity lifetime and taint analysis.

The lifetime component 205 of FIG. 2 represents this lifetime and taint analysis functionality. In embodiments, the lifetime component 205 can independently track memory addresses and/or registers associated with each entity. Accordingly, for each entity, the lifetime management component can start by tracking an initial storage location (e.g., memory address or register) associated with the entity, and then automatically track other memory addresses and/or registers to which the value of the initial storage location (or a derivative thereof) is copied. Thus, as shown, the lifetime component 205 can maintain a different storage location collection 205a for each tracked entity (e.g., a set comprising unique memory addresses and/or registers). The collection management module 205c can manage these storage location collections 205a, such as by adding memory addresses and registers to which the value of the initial storage location (or a derivative thereof) is copied, and by removing memory addresses and registers that no longer contain the value of the initial storage location (or a derivative thereof). The breakpoint management component 205e can manage active memory and register breakpoints (e.g., in cooperation with the register breakpoint component 202 and the memory breakpoint component 204) based on the memory addresses/registers specified in storage location collections 205a. In embodiments, the breakpoint management component 205e might tag each memory and register breakpoint the identity of one or more entities whose lifetime is being tracked.

In addition to tracking memory addresses and registers associated with each entity, the lifetime management component 205d can also track interrelationships between those memory addresses and registers in lifetimes 205b using an appropriate format such trees or graphs. With this information, the lifetime/taint analysis component 205f can be used to perform lifetime/taint analysis, and present results at a user interface. For example, for a given entity, the lifetime/taint analysis component 205f might present to a user the storage locations that were added to the entity's lifetimes 205b, the lifetime/taint analysis component 205f might a timeline of when those storage locations had an active lifetime, etc.

Because the breakpoint management component 205e ensures that each storage location specified in the storage location collections 205a has an appropriate memory or register breakpoint set, a breakpoint could be triggered each time a storage location specified in at least one of the storage location collections 205a is touched. In embodiments, when a breakpoint triggers on one of these storage locations, the collection management component 205c determines whether the storage location was touched due to a read access or a write access.

If the touched storage location was read, the lifetime component 205 might start tracking a destination storage location and extend the touched storage location's lifetime to the destination storage location. For example, the collection management component 205c could add any destination storage location(s) that took on the value of the read (or a derivative thereof) to any of the storage location collections 205a that included the touched storage location (i.e., because a tracked value, or derivative thereof, was written, continuing a data continuity), and the lifetime management component 205d could note an extension of a lifetime to the touched storage location in the any corresponding lifetime 205b data structure(s).

If the touched storage location was written to, and if the data written was not already tracked (e.g., because it was read from a non-tracked storage location, or because it is a constant), the lifetime component 205 might stop tracking the touched storage location and terminate its lifetime. For example, the collection management component 205c could remove the touched storage location from any of the storage location collections 205a that included the touched storage location (i.e., because the value was overridden, ending data continuity), and the lifetime management component 205d could note an end of lifetime with respect to the touched storage location in any corresponding lifetime 205b data structure(s). On the other hand, if the data written was already tracked (e.g., because it was read from a tracked storage location), the lifetime component 205 might refrain from stopping tracking of the touched storage location and terminating its lifetime (e.g., a no-operation). Alternatively, if the data written was already tracked, the lifetime component 205 might stop tracking of the touched storage location, and then restart tracking for the touched storage location.

Thus, to summarize, in embodiments (i) a write to a non-tracked storage location with data read from a tracked storage location could result in the written-to storage location being tracked and a lifetime being extended to the written-to storage location; (ii) a write to a tracked storage location with data read from a non-tracked storage location, or with a constant, could result in the written-to storage location being non-tracked and termination of the written-to storage location's lifetime; and (iii) a write to a tracked storage location with data read from a tracked storage location could result in either no operation, or in tracking being stopped and then re-started for the written-to storage location. It is noted that if the lifetime component 205 updates tracking based on events (e.g., events generated by the event generation component 203g), embodiments might document the order in which events are generated so that any code listening to the events can determine how to properly handle the foregoing combinations.

Figure 5A:
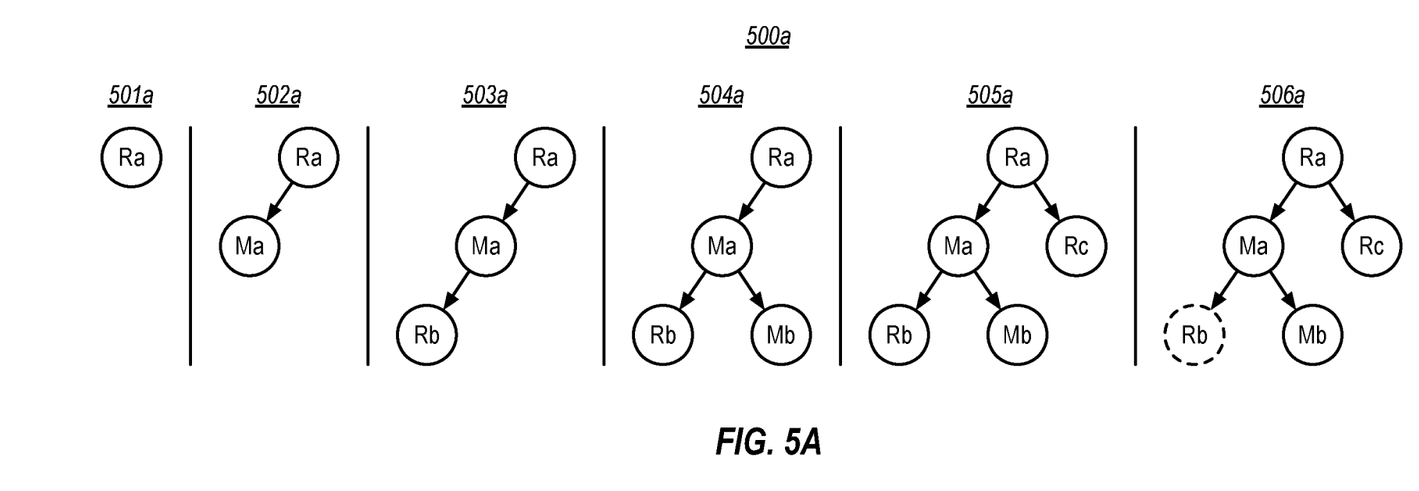
FIG. 5A illustrates an example of lifetime graphs.
Figure 5B:
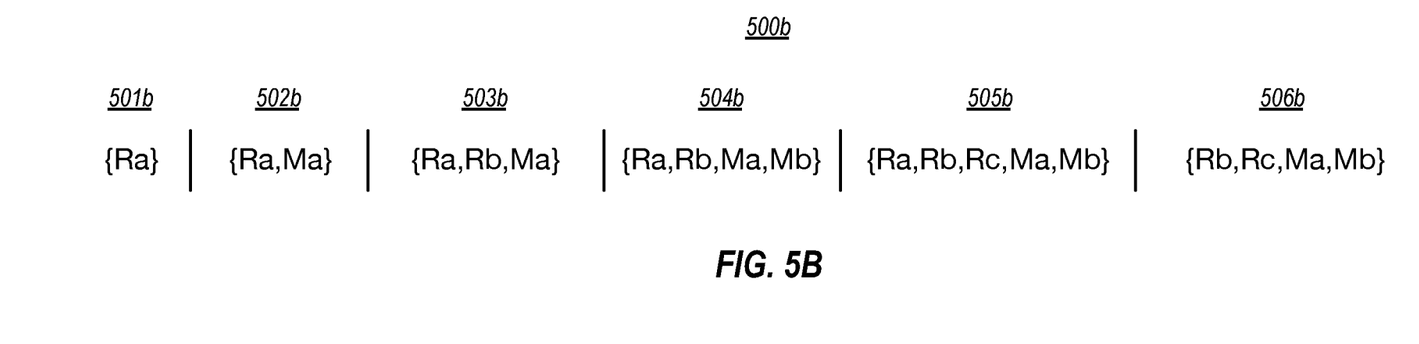
FIG. 5B illustrates an example of storage location collections.

In accordance with the foregoing, FIGS. 5A and 5B illustrate an example of automatic register/memory location tracking and lifetime tracking. In particular, FIG. 5A illustrates an example 500a of lifetime graphs (e.g., lifetimes 205b), and FIG. 5B illustrates a corresponding example 500b of storage location collections (e.g., collections 205a).

Referring to FIG. 5A, the example 500a shows that, at a time 501a, the lifetime management component 205d has initiated tracking of a storage location—a register referred to as Ra. Correspondingly, example 500b shows that, at a corresponding at time 501b, the collection management component 205c has added this register to a storage location collection. Because this collection includes register Ra, the breakpoint management component 205e can ensure that there is an active register breakpoint for register Ra.

Next, at time 502a/502b, suppose that there a breakpoint was triggered on register Ra, and that the machine code instruction that triggered the breakpoint copied a value stored in register Ra to a memory location—Ma. As discussed, because this was a read, the collection management component 205c can add the destination storage location to the storage location collection (as shown in FIG. 5B at time 502b), and the lifetime management component 205d can extend lifetime continuity to this memory location (as shown in FIG. 5A at 502a). Because this collection now also includes memory location Ma, the breakpoint management component 205e can ensure that there is an active memory breakpoint for memory address Ma.

FIGS. 5A-5C show that, at times 503a/503b and 505a/505b, similar additions to the storage location collection, similar extensions to the lifetime continuity, and similar additions to memory and register breakpoints can be made based on copying the value from a memory location to a register (i.e., Ma→Rb), from a memory location to a memory location (i.e., Ma→Mb), and from a register to a register (i.e., Ra→Rc).

Next, at time 506a/506b, suppose that there a breakpoint was triggered on memory register Rb, and that the machine code instruction that triggered the breakpoint stored a non-tracked value into Rb (e.g., a constant, or a value from a non-tracked memory location or register). As discussed, because this was a write, the collection management component 205c can remove the register from the storage location collection (as shown in FIG. 5B at time 502b), and the lifetime management component 205d can end the lifetime for this storage location (as shown in FIG. 5A at 506a).

In view of the foregoing discussion of lifetime component 205 and FIG. 5, it will be appreciated that method 400 can include acts for enabling lifetime analysis. For example, in connection with triggering of an event on a write operation, method 400 could include, based at least on the executable operations writing to the register, the event causing the register to be removed from a monitoring collection (e.g., by collection management component 205c). Additionally, in connection with triggering of an event on a write operation, method 400 could include, based at least on the executable operations writing to the register, the event causing a lifetime corresponding to the register to terminate (e.g., by the lifetime management component 205d making an appropriate annotation in lifetime data structure).

In another example, in connection with triggering of an event on a read operation, method 400 could include, based at least on the executable operations reading from the register, the event causing a destination of the read to be added to a monitoring collection (e.g., by collection management component 205c). Additionally, in connection with triggering of an event on a write operation, method 400 could include, based at least on the executable operations reading from the register, the event causing a lifetime corresponding to the register to be extended to the destination (e.g., by the lifetime management component 205d making an appropriate annotation in lifetime data structure).

In embodiments, the lifetime component 205 might be triggered based on a memory or register breakpoint being associated with an entity lifetime. Thus, for example, one or more register breakpoints in breakpoints 202b might be tagged with one or more lifetimes to which they are associated (e.g., based on identifying a corresponding collection 205a and/or lifetime 205b). Thus, in method 400, the register breakpoint collection might associate at least one register with one or more entity lifetimes.

It is also noted that while the efficient register breakpoint detection described above could be combined with many types of memory breakpoint detection, some embodiments combine it with efficient memory breakpoint detection mechanisms that rely on caches (rather than code instrumentation) to support an unbounded number of memory breakpoints in a highly performant manner. In particular, these memory breakpoint detection mechanisms enable breakpoint checks to be performed only when a cache miss occurs, rather than when each memory access operation occurs—which greatly reduces the occurrence of breakpoint checks and greatly improves performance when detecting memory breakpoints.

Figure 6:
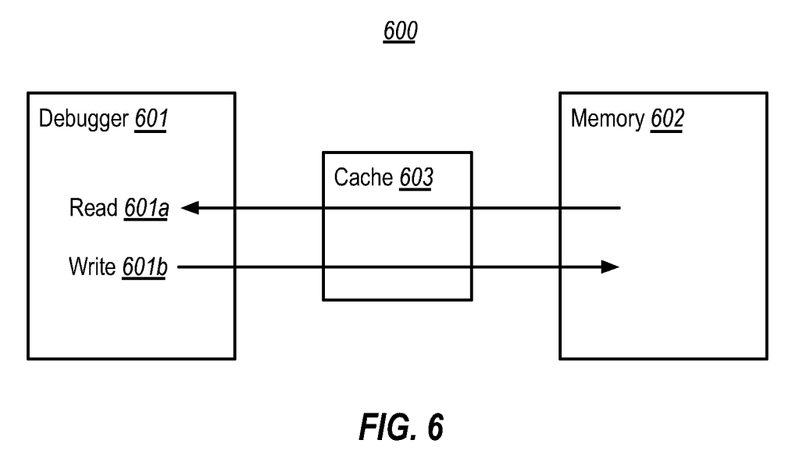
FIG. 6 illustrates an example environment for detecting for memory breakpoints using a cache.

To illustrate this concept, FIG. 6 depicts an example environment 600 for detecting for memory breakpoints using a cache. In FIG. 6, a debugger 601 (e.g., debugger 201 of FIG. 2) causes subject code to perform memory reads 601a and writes 601b to memory 602 (e.g., system memory 103) through a cache 603 (e.g., a portion of caches 106). However, rather than using this cache 603 in a conventional manner, the debugger 601 operates to ensure that any cache line(s) corresponding to memory address(es) that are being monitored for breakpoints (e.g., addresses in a memory breakpoint collection) are evicted from the cache 603.

For example, when memory address(es) are added to a memory breakpoint collection, the memory breakpoint component 204 can check if there already exists any cache line(s) in the cache 603 that overlap with these memory address(es); if so, the memory breakpoint component 204 evicts them from the cache 603. Then, when a cache miss occurs based on access to any memory address, the processor 102 determines if a breakpoint check is needed. In particular, the processor 102 compares the cache line that was imported into the cache based on the cache miss memory addresses in the watch list 202a to determine if there are any overlapping memory address(es).

If there is no overlapping memory address, then a breakpoint could not have occurred, and so the cache miss is honored normally (e.g., it is permitted to remain in the cache 603). If there is an overlap, however, a breakpoint could have occurred—so a breakpoint check is performed to determine if a breakpoint was actually encountered. For example, the memory breakpoint component 204 could determine if the portion of the cache line corresponding with the overlapping memory address was actually accessed (i.e., a breakpoint has occurred), or if only some other portion of the cache line was accessed (i.e., a breakpoint did not occur). Additionally, if there was an overlapping address, the cache line is evicted from the cache 603 so that another cache miss will occur—and with it another breakpoint check will be performed—if the memory address is accessed again later. In this way, breakpoint checks only need to be performed for some memory access operations that cause a cache miss to occur, rather than with each memory access operation.

Accordingly, by implementing the breakpoint checking embodiments described in connection with FIG. 6, the memory breakpoint component 204 can provide efficient mechanisms for watching for a large number of memory addresses. However, the memory breakpoint component 204 is not limited to use of these mechanisms.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A method, implemented at a computer system that includes one or more processors, for performing a register breakpoint check, the method comprising:
    decoding a machine code instruction that is a subject of a debugging session;
    based on the decoding,
        identifying one or more registers that the machine code instruction could potentially touch during execution of the machine code instruction, including identifying a register storing a processor flag that could be affected by execution of the machine code instruction, and
        inserting an identification of the identified one or more registers into a stream of executable operations for the machine code instruction;
    subsequent to inserting the identification of the identified one or more registers into the stream of executable operations for the machine code instruction, executing the machine code instruction by executing the executable operations for the machine code instruction; and
    after executing the executable operations for the machine code instruction,
        identify, from the identification of the identified one or more registers that was inserted into the stream of executable operations for the machine code instruction, a particular register that was actually touched by execution of the executable operations for the machine code instruction, the particular register comprising the register storing the processor flag and which was affected by execution of the executable operations for the machine code instruction; and
        perform at least the following for the touched particular register:
            compare the particular register with a register breakpoint collection; and
            generate an event when the particular register is in the register breakpoint collection.

2. The method of claim 1, wherein the method is implemented by an emulator.

3. The method of claim 1, wherein the event triggers at least one of an execution break or logging of the event.

4. The method of claim 1, wherein the event triggers an analysis of one or more conditions specified for the touched particular register, and wherein the event triggers at least one of an execution break or logging of the event when at least one of the one or more conditions is met.

5. The method of claim 4, wherein the one or more conditions include at least one of a read condition, a write condition, or a register value condition.

6. The method of claim 1, wherein, based at least on the executable operations writing to the particular register, the event causes the particular register to be removed from a monitoring collection.

7. The method of claim 1, wherein, based at least on the executable operations writing to the particular register, the event causes a lifetime corresponding to the particular register to terminate.

8. The method of claim 1, wherein, based at least on the executable operations reading from the particular register, the event causes a destination of the read to be added to a monitoring collection.

9. The method of claim 1, wherein, based at least on the executable operations reading from the particular register, the event causes a lifetime corresponding to the register to be extended to a destination.

10. The method of claim 1, wherein the register breakpoint collection associates at least one register with one or more entity lifetimes.

11. A computer system, comprising:
    one or more processors; and
    one or more computer-readable media having stored thereon computer-executable instructions that are executable by the one or more processors to cause the computer system to perform a register breakpoint check, the computer-executable instructions including instructions that are executable by the one or more processors to perform at least:
        decode a machine code instruction that is a subject of a debugging session;
        based on the decoding,
            identify one or more registers that the machine code instruction could potentially touch during execution of the machine code instruction, including identifying a register storing a processor flag that could be affected by execution of the machine code instruction, and
            insert an identification of the identified one or more registers into a stream of executable operations for the machine code instruction;
        subsequent to inserting the identification of the identified one or more registers into the stream of executable operations for the machine code instruction, executing the machine code instruction by executing the executable operations for the machine code instruction; and after executing the executable operations for the machine code instruction, identify, from the identification of the identified one or more registers that was inserted into the stream of executable operations for the machine code instruction, a particular register that was actually touched by execution of the executable operations for the machine code instruction, the particular register comprising the register storing the processor flag and which was affected by execution of the executable operations for the machine code instruction; and perform at least the following for the touched particular register:

compare the particular register with a register breakpoint collection; and generate an event when the particular register is in the register breakpoint collection.

12. The computer system of claim 11, wherein executing the machine code instruction comprises executing the machine code instruction at an emulated processor.

13. The computer system of claim 11, wherein the event triggers at least one of an execution break or logging of the event.

14. The computer system of claim 11, wherein the event triggers an analysis of one or more conditions specified for the particular register, and wherein the event triggers at least one of an execution break or logging of the event when at least one of the one or more conditions is met.

15. The computer system of claim 14, wherein the one or more conditions include at least one of a read condition, a write condition, or a register value condition.

16. The computer system of claim 11, wherein based at least on the executable operations writing to the particular register, the event causes the particular register to be removed from a monitoring collection and causes a lifetime corresponding to the particular register to terminate.

17. The computer system of claim 11, wherein, based at least on the executable operations reading from the particular register, the event causes a destination of the read to be added to a monitoring collection and causes a lifetime corresponding to the particular register to be extended to the destination.

18. A method, implemented at a computer system that includes one or more processors, for performing a register breakpoint check and enabling lifetime analysis, the method comprising:

decoding a machine code instruction that is a subject of a debugging session;

based on the decoding, identifying one or more registers that the machine code instruction could potentially touch during execution of the machine code instruction, including identifying a register storing a processor flag that could be affected by execution of the machine code instruction, and inserting an identification of the identified one or more registers into a stream of executable operations for the machine code instruction;

subsequent to inserting the identification of the identified one or more registers into the stream of executable operations for the machine code instruction, executing the machine code instruction by executing the executable operations for the machine code instruction; and after executing the executable operations for the machine code instruction, identify, from the identification of the identified one or more registers that was inserted into the stream of executable operations for the machine code instruction, a particular register that was actually touched by execution of the executable operations for the machine code instruction, the particular register comprising the register storing the processor flag and which was affected by execution of the executable operations for the machine code instruction; and perform at least the following for the touched particular register:

comparing the particular register with a register breakpoint collection;

generating an event when the particular register is in the register breakpoint collection, the event performing at least one of:

based at least on the executable operations writing to the particular register, removing the particular register from a monitoring collection and noting a lifetime termination in a lifetime structure; or based at least on the executable operations reading from the particular register, adding a destination of the read to the monitoring collection and extending a lifetime in the lifetime structure to the destination.

19. The method of claim 18, wherein the destination comprises one of a destination register or a destination memory location.

* * * * *